United States Patent
Chen et al.

(10) Patent No.: US 7,805,366 B2
(45) Date of Patent: Sep. 28, 2010

(54) METHOD AND SYSTEM TO FACILITATE PAYMENTS TO SATISFY PAYMENT OBLIGATIONS RESULTING FROM PURCHASE TRANSACTIONS

(75) Inventors: Andrew Dali Chen, Santa Clara, CA (US); Brian Andrew Phillips, San Francisco, CA (US); Chad Meredith Hurley, Palo Alto, CA (US); Dantley Davis, San Jose, CA (US); Paul Arthur Martin, Menlo Park, CA (US); Yu Pan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1031 days.

(21) Appl. No.: 10/805,414

(22) Filed: Mar. 19, 2004

(65) Prior Publication Data

US 2005/0097040 A1    May 5, 2005

Related U.S. Application Data

(60) Provisional application No. 60/456,820, filed on Mar. 21, 2003.

(51) Int. Cl.
*G06Q 40/00* (2006.01)
(52) U.S. Cl. .............................. 705/40; 705/39; 705/42
(58) Field of Classification Search ............. 705/26–40, 705/42
See application file for complete search history.

(56) References Cited

U.S. PATENT DOCUMENTS

| | | | |
|---|---|---|---|
| 5,778,178 A | | 7/1998 | Arunachalam |
| 5,943,656 A | * | 8/1999 | Crooks et al. .................. 705/30 |
| 5,966,697 A | * | 10/1999 | Fergerson et al. ............. 705/26 |
| 5,987,500 A | | 11/1999 | Arunachalam |
| 6,212,556 B1 | | 4/2001 | Arunachalam |

(Continued)

FOREIGN PATENT DOCUMENTS

WO    WO-2008033551 A2    3/2008

(Continued)

OTHER PUBLICATIONS

Innovations in retail payments: e-payments Helen Allen. Bank of England. Quarterly Bulletin. London: Winter 2003. vol. 43, Iss. 4; p. 428.*

(Continued)

*Primary Examiner*—Hani Kazimi
*Assistant Examiner*—William E Rankins
(74) *Attorney, Agent, or Firm*—Schwegman, Lundberg & Woessner, P.A.

(57) ABSTRACT

A payment system includes a transaction identification system to identify a plurality of purchase transactions, established utilizing one or more transaction systems that impose a plurality of corresponding payment obligations on a particular user. An interface generator generates an aggregation interface that presents the plurality of purchase transactions to the first user. The plurality of purchase transactions are presented in conjunction with a payment option to initiate an automatic payment process with respect to at least a subset of the purchase transactions. A payment engine initiates the automatic payment process with respect to the first subset of plurality of purchase transactions upon election by the first user of the payment option.

21 Claims, 9 Drawing Sheets

U.S. PATENT DOCUMENTS

| | | | |
|---|---|---|---|
| 6,292,789 B1* | 9/2001 | Schutzer | 705/40 |
| 6,343,278 B1* | 1/2002 | Jain et al. | 705/36 R |
| 6,965,868 B1* | 11/2005 | Bednarek | 705/9 |
| 2002/0002530 A1 | 1/2002 | May | |
| 2002/0013768 A1* | 1/2002 | Ganesan | 705/40 |
| 2002/0116305 A1* | 8/2002 | Abhyanker | 705/35 |
| 2002/0120582 A1 | 8/2002 | Elston et al. | |
| 2002/0161707 A1* | 10/2002 | Cole et al. | 705/42 |
| 2003/0154164 A1 | 8/2003 | Mascavage et al. | |
| 2003/0216996 A1 | 11/2003 | Cummings et al. | |
| 2004/0019564 A1 | 1/2004 | Goldthwaite et al. | |
| 2004/0039689 A1* | 2/2004 | Penney et al. | 705/38 |
| 2004/0059672 A1* | 3/2004 | Baig et al. | 705/40 |
| 2004/0139015 A1 | 7/2004 | Luttge | |
| 2004/0225606 A1* | 11/2004 | Nguyen et al. | 705/40 |
| 2004/0230536 A1 | 11/2004 | Fung et al. | |
| 2005/0192893 A1 | 9/2005 | Keeling et al. | |
| 2006/0206425 A1* | 9/2006 | Sharma | 705/40 |
| 2006/0212393 A1* | 9/2006 | Lindsay Brown | 705/40 |
| 2007/0011104 A1 | 1/2007 | Leger et al. | |

FOREIGN PATENT DOCUMENTS

WO    WO-2008033551 A3    3/2008

OTHER PUBLICATIONS

U.S. Appl. No. 11/168,277, Response filed Jun. 19, 2009 to Restriction Requirement mailed Mar. 19, 2009, 5 pgs.

U.S. Appl. No. 11/168,277, Restriction Requirement mailed Mar. 19, 2009, 6 pgs.

U.S. Appl. No. 11/521,997, Non-Final Office Action mailed Aug. 11, 2009, 18 pgs.

International Application Serial No. PCT/US2007/20109, Search Report and Written Opinion mailed on Sep. 4, 2008, 9 pgs.

* cited by examiner

METHOD AND SYSTEM TO FACILITATE PAYMENTS TO SATISFY PAYMENT OBLIGATIONS RESULTING FROM PURCHASE TRANSACTIONS

The present patent application claims the priority benefit of the filing date of U.S. Provisional Application Ser. No. 60/456,820 filed Mar. 21, 2003, which is incorporated herein by reference.

FIELD OF THE INVENTION

Exemplary embodiments of the present invention relate generally to the field of commerce automation and, more specifically, to a method and system to facilitate payments transactions between users of a payment system.

BACKGROUND OF THE INVENTION

Network-based electronic marketplaces are becoming increasingly popular venues for users (e.g., individuals, companies, and corporations) to perform purchase transactions whereby a seller agrees to transfer ownership of an item, or to perform a service, for an exchange of value. Very often, such a purchase transaction may impose payment obligations on one or more of the parties to a purchase transaction.

A number of network-based payment systems currently facilitate payments between users in satisfaction of such payment obligations. Where a particular user has engaged in multiple purchase transactions, utilizing one or more transaction systems, making payments for these multiple transactions can be cumbersome.

SUMMARY OF THE INVENTION

A payment system includes a transaction identification system to identify a plurality of purchase transactions, established utilizing one or more transaction systems, that impose a plurality of corresponding payment obligations on a particular user. An interface generator generates an aggregation interface that presents the plurality of purchase transactions to the first user. The plurality of purchase transactions are presented in conjunction with a payment option to initiate an automatic payment process with respect to at least a subset of the purchase transactions. A payment engine initiates the automatic payment process with respect to the first subset of plurality of purchase transactions upon election by the first user of the payment option.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to facilitate payment in satisfaction of a payment obligation imposed by a transaction are described. For some example embodiments, a payment system may include a transaction identification system to identify a plurality of purchase transactions, established utilizing one or more transaction systems that impose a plurality of corresponding payment obligations on a particular user. An interface generator generates an aggregation interface that presents the plurality of purchase transactions to the first user. The plurality of purchase transactions is presented in conjunction with a payment option to initiate an automatic payment process with respect to at least a subset of the purchase transactions. A payment engine initiates the automatic payment process with respect to the first subset of plurality of purchase transactions upon election by the first user of the payment option. In the following description, for the purposes of explanation, numerous specific details are set forth in order to provide a thorough understanding of the present invention. It will be evident, however, to one skilled in the art that the present invention may be practiced without these specific details.

Figure 1:
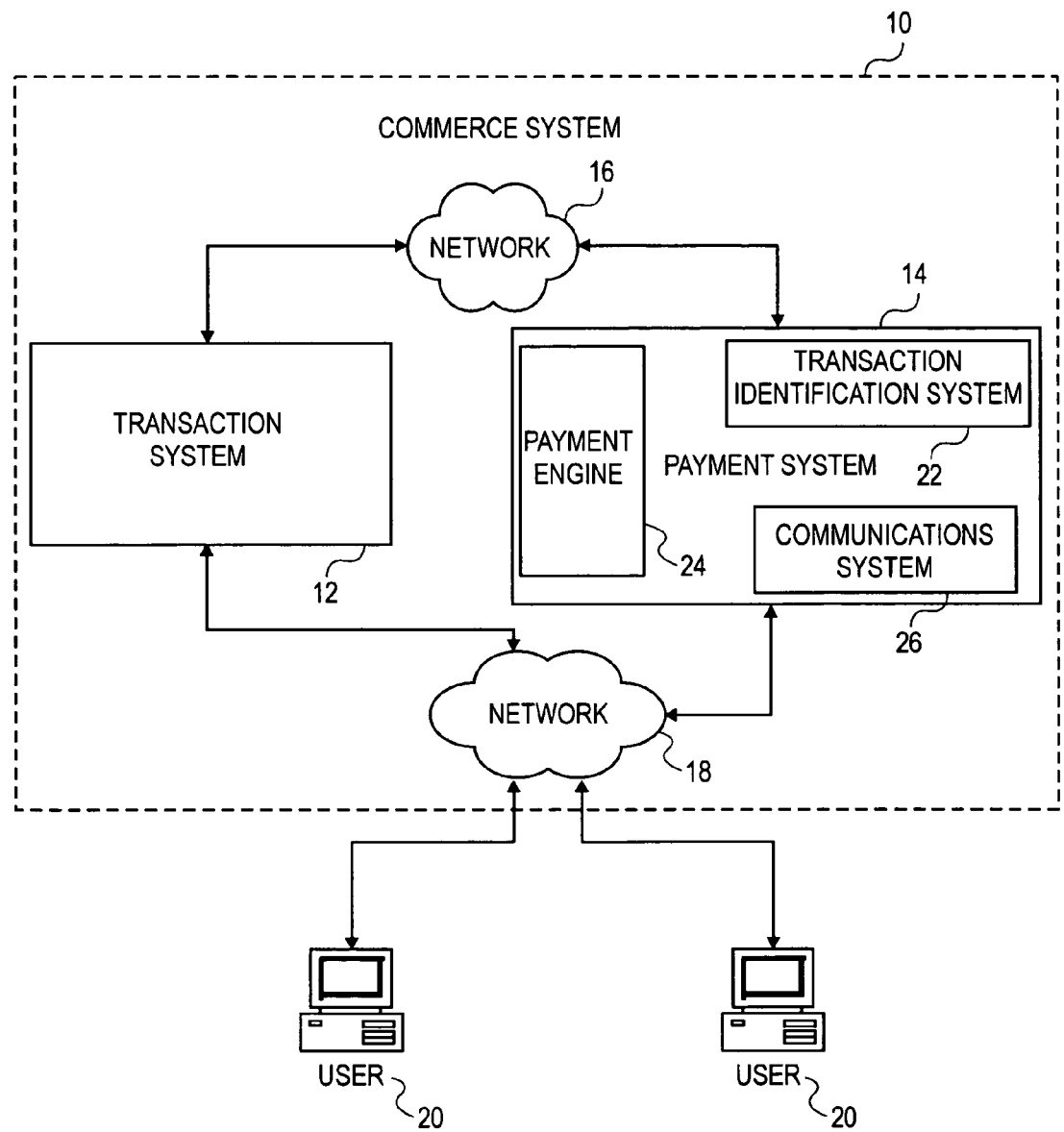
FIG. 1 is a block diagram illustrating a commerce system, according to an exemplary embodiment of the present invention, which includes a transaction system and a payment system.

FIG. 1 is a block diagram illustrating a commerce system 10, according to an exemplary embodiment of the present invention, which includes a transaction system 12 and a payment system 14. In the exemplary commerce system 10, the transaction system 12 and the payment system 14 are shown to be distinct systems that communicate via a network 16 (e.g., the Internet, a Wide Area Network (WAN) or a Local Area Network (LAN)). However, in alternative embodiments, the transaction and payment systems 12 and 14 may be more tightly integrated. For example, the payment system 14 may be implemented as a sub-system of the transaction system 12.

The transaction system 12 operates to facilitate the establishment of transactions between users 20 that may access the transaction system 12 via a network 18. The network 18 may be the same network as the network 16 via which the systems 12 and 14 communicate, or may be a distinct network. In any event, the transaction system 12 may facilitate the establishment of any one of a number of transactions between users 20. For example, the transaction system 12 may function as a network-based marketplace via which a seller user 20 offers items or services for sale, and a buyer user 20 agrees to purchase such item or services. The transaction system 12 may also support any one of a number of price setting mechanisms, such as one or more auction price setting mechanisms or a fixed-price setting mechanism. The transaction system 12 may, for example, operate as a person-to-person (P2P), a person-to-business (P2B), or a business-to-business (B2B) marketplace.

The payment system 14, in the exemplary embodiment, operates to facilitate payments between users in satisfaction of payment obligations imposed by transactions established utilizing the transaction system 12. The payment system 14 may be dedicated to facilitating payments with respect to transactions established by one or more transaction systems 12, or may be more widely deployed to facilitate payment for transactions established in any manner. For example, the payment system 14 may comprise the PAYPAL®, payment service operated by PayPal, Inc. a subsidiary of eBay Inc. of San Jose, Calif.

The payment system 14 is further shown to include a transaction identification system 22, a payment engine 24 and a communications system 26. The transaction identification system 22 is responsible, in the exemplary embodiment, for identifying transactions established utilizing the transaction system 12, and for which a particular user, or group of users, have outstanding payment obligations. The payment engine 24 is responsible for transferring funds (or other value) between users and the communications system 26 is responsible for communicating information (e.g., emails, markup language documents, instant messages, short message service (SMS), messages, etc.) to users. Such information may be information pertinent to services offered by, and activities performed via, the payment system 14.

In one exemplary embodiment, the payment engine 24 may operate in the manner described in any of the International Patent Applications Nos. WO02069092, WO0205231, or WO0205224, each of which is incorporated by reference.

Figure 2:
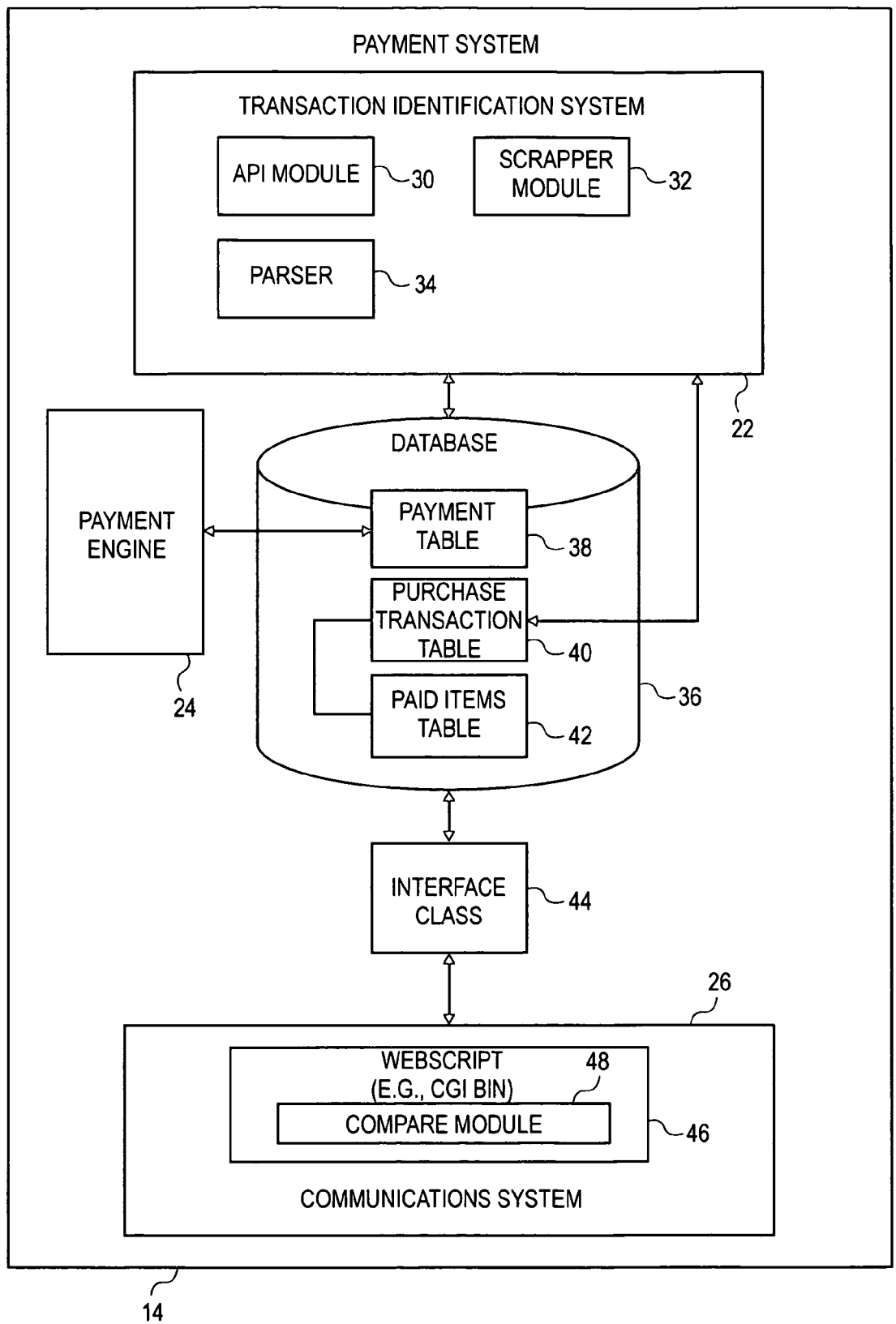
FIG. 2 is a block diagram illustrating further details regarding an exemplary architecture for the payment system.

FIG. 2 is a block diagram illustrating further details regarding an exemplary architecture for the payment system 14. The transaction identification system 22 is shown to include an Application Program Interface (API) module 30, a scrapper module 32 and a parser 34. The API module 30 issues calls to the APIs of transaction systems 12 to request specific information. The scrapper module 32, in one exemplary embodiment, operates as an alternative to the API module 30 to retrieve transaction information from transaction systems 12 by "scrapping" such information from web pages (e.g., HTML documents) in a manner well known to those skilled in the art.

Both the API module 30 and the scrapper module 32 may communicate received, or retrieved, transaction information to a parser 34 that parsers this transaction information to identify specific information items.

The transaction identification system 22 communicates transaction information to a database 36, in which are stored a payment table 38, a purchase transaction table 40, and a paid items table 42. The payment table 38 is populated with records generated by the payment engine 24, each record recording the transfer or receipt of funds into or from an account of a user. For example, for a single transaction where funds are transferred from an account of a payer to the account of a payee, two (2) records may exist within the payment table 38, one record indicating the withdrawal of funds from the account of the payer, and another record indicating the deposit of the funds into an account of the payee.

Figure 3:
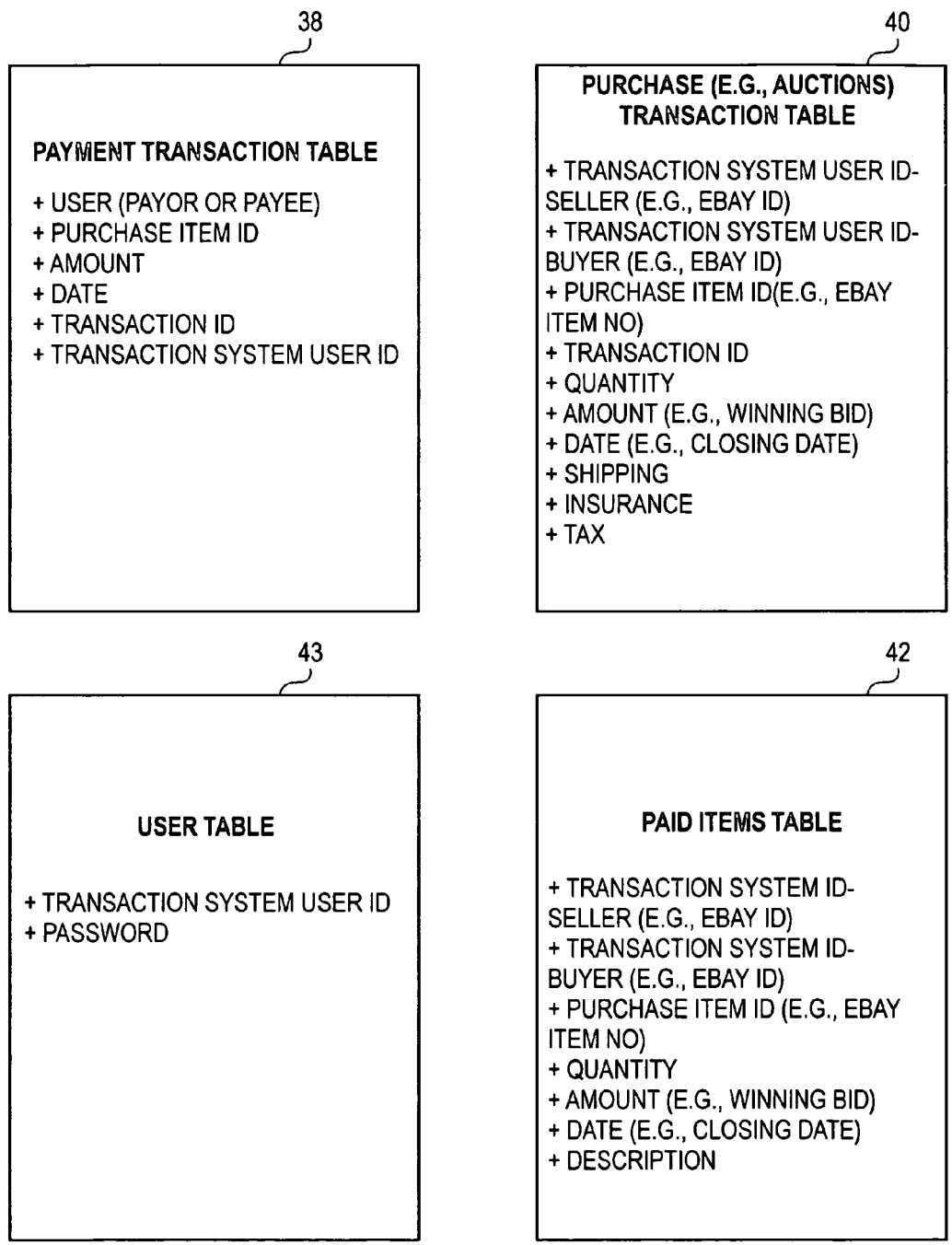
FIG. 3 provides an example of the exemplary fields that may be populated within the payment table.

FIG. 3 provides an example of the exemplary fields that may be populated within the payment table 38.

The purchase transaction table 40 is populated primarily with information gleaned by the transaction identification system 22 from the transaction system 12. Again, FIG. 3 provides a list of exemplary fields that may be defined within the purchase transaction table 40.

The paid items table 42 is populated with records corresponding at least partially to records within the purchase transaction table 40, and for which corresponding payment records were located within the payment table 38, as will be described in further detail below. Specifically, upon identification of a correspondence, between a record in the payment table 38 and the purchase transaction table 40, indicating that a payment for a particular transaction had been made by a particular user, the record may be migrated from the purchase transaction table 40 to the paid items table 42.

Returning to FIG. 2, the communications system 26 accesses an interface class 44 that provides a range of functionality with respect to writing to, and reading from, the database 36. The communications system 26 is also shown to include a webscript module 46 that, in one exemplary embodiment, comprises a CGI BIN, which in turn includes a compare module 48. The compare module 48 is responsible, in one exemplary embodiment, for detecting correlations or correspondences between records in the payment table 38 and the purchase transaction table 40. In alternative embodiments, the functionality included within the compare module 48 may reside at other locations within the payment system 14, such as for example, in an application executing on an application server (not shown) or as a script residing on a database server (not shown).

The webscript module 46 is responsible for retrieving information from the various tables within the database 36, and dynamically generating files in the exemplary form of Hypertext Markup Language (HTML) documents, that include the retrieved information.

The communications system 26 may also include a number of servers (not shown) to facilitate communications with the payment system 14 over the network 18. Such servers may include, for example, a web server, an email server, an instant message (IM) server, a SMS server, etc.

Figure 4:
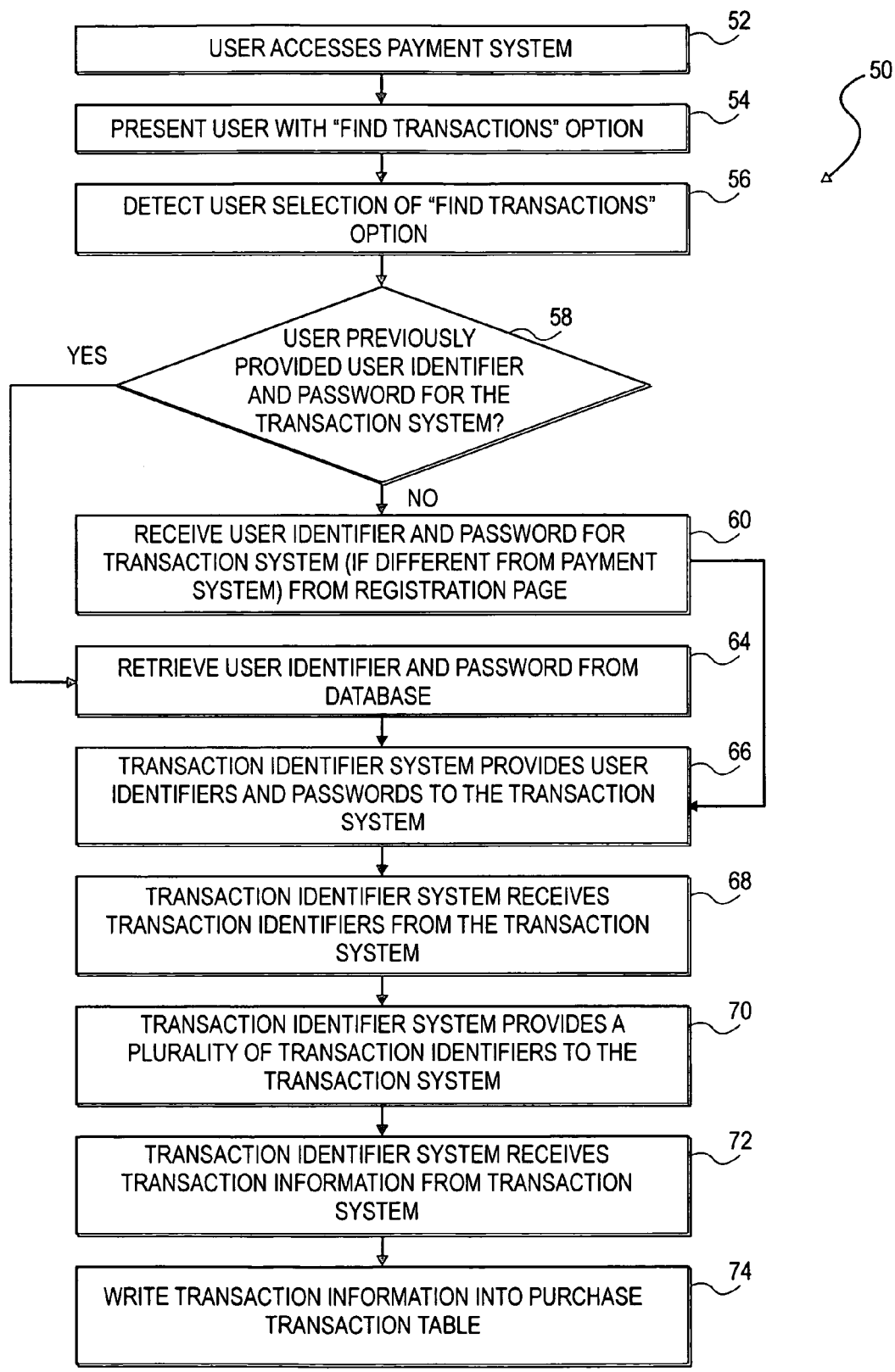
FIG. 4 is a flow chart illustrating a method, according to an exemplary embodiment of the present invention, to retrieve transaction information pertaining to multiple purchase transactions from a transaction system, such as the transaction system.

FIG. 4 is a flow chart illustrating a method 50, according to an exemplary embodiment of the present invention, to retrieve transaction information pertaining to multiple purchase transactions from a transaction system, such as the transaction system 12.

The method 50 commences at operation 52 when a user 20 accesses the payment system 14. The user 20 may login via a web interface provided by the communications system 26 of the payment system 14, and be presented with a personalized interface displaying various options, services and payment information relevant to the user 20.

At operation 54, the payment system 14 presents the user with a "find transactions" option. In one exemplary embodiment, a "find transaction" button is presented on a web page generated and communicated from the payment system 14 to a user 20. At operation 56, the payment system 14 detects whether the user 20 has selected the "find transaction" option by, for example, clicking on the "find transactions" button.

It will be appreciated that, in one embodiment where the payment system 14 and the transaction system 12 are separate entities, the payment system 14 will require access information from the user 20 in order to authorize retrieval of appropriate information from the transaction system 12. In an alternative embodiment in which the payment system 14 and the transaction system 12 are tightly integrated, the payment system 14 may not require additional access information (e.g., a user name/password) to access the transaction system 12, in which case the performance of a number of the operations described below may be omitted.

Returning to FIG. 4, at decision operation 58, the payment system 14 determines whether the relevant user 20 had previously provided, to the payment system 14, user identifier and password information necessary for accessing information of the user 20 stored on the transaction system 12. Specifically, a user table 43, illustrated in FIG. 3, may be maintained within the database 36 of the payment system 14, and this user table 43 may be accessed to determine whether a transaction system user identifier and password are stored for the relevant user.

In the event that a user identifier and password had not previously been provided, the payment system 14 then presents a registration page to the user 20 at operation 60, and the payment system 14 receives the relevant transaction system user identifier and password for the transaction system 12. The received user identifier and password may optionally then be stored in the user table 43 as part of a record for the relevant user 20.

On the other hand, should it be determined at operation 58 that the user identifier and password had in fact previously been provided, this information is then retrieved from the user table 43 within the database 36 at operation 64.

At operation 66, the payment system 14, and more specifically the transaction identification system 22, provides the transaction system user identifier and password of the user 20 to the transaction system 12. In one exemplary embodiment, this transaction system user identifier and password may be included within a call from the API module 30 of the transaction identification system 22 to an API of the transaction system 12. This call, in one embodiment, is a request to receive identifiers for each transaction established via the transaction system 12 and in which the relevant user 20 was a participant or party. The call may optionally only request identifiers for transactions concluded within a predetermined time period (e.g., within the past 1 month, within the past year, etc.).

At operation 68, the transaction identification system 22 of the payment system 14 receives one or more transaction identifiers from the transaction system 12 responsive to the request issued at operation 66. In the exemplary embodiment, the API of the transaction system 12 may return a list of transaction identifiers to the payment system 14.

At operation 70, the payment system 14 then provides one or more of the received transaction identifiers back to the transaction system 23 as part of a request for further information regarding the relevant transactions. The transaction identifiers provided at operation 70 may, in one embodiment, be a subset of the identifiers received at operation 68, this subset having been identified based on various criteria. For example, a compare module 48 at the payment system 14 may, prior to operation 70, determine whether any of the received transaction identifiers correspond to transaction identifiers recorded within the payment table 38 for payments involving the user 20. Transaction identifiers for which records exist within the payment table 38 would then be excluded from the transaction identifiers communicated to the transaction system 12 at operation 70. Again, the transaction identifiers provided at operation 70 may, in one embodiment, be provided as part of a call issued from the API module 30 to an API of the transaction system 12.

At operation 72, the transaction identification system 22 receives transaction information, corresponding to the provided transaction identifiers, from the transaction system 12. This information may be provided as a response to the call issued from the API module 30. At operation 74, the payment system 14 writes the received transaction information into the purchase transaction table 40. Specifically, the API module 30 may provide the received transaction information to the parser 34, which identifies pertinent information within the retrieved information, and instructs a write operation to the purchase transaction table 40.

In an alternative embodiment, the transaction information that is described above as written at operation 74 that may be retrieved by the scrapper module 32, instead of or in conjunction with, the API module 30. Specifically, the scrapper module 32 may communicate with the transaction system 12 via a web interface (not shown) of the transaction system 12 to provide the transaction system user identifier and password of the user 20. In response to the provision of this information, the transaction system 12 may generate web pages from which the scrapper module 32, in conjunction with the parser 34, is able to extract the transaction information that is then written to the purchase transaction table 40 at operation 74.

It will be appreciated that the transaction information received at operation 72 may pertain to transactions concluded by any one of a number of price setting mechanisms. For example, where the transaction system 12 provides an auction mechanism, one or more transactions may have been established utilizing Dutch or Chinese auction formats. Further, the transaction may have been concluded utilizing a fixed price mechanism. In any event, the transaction information received at operation 72, and written to the purchase transaction table 40, may include any information pertinent to a wide variety of transaction types or price setting mechanisms. For example, where the transaction was established utilizing a Dutch auction, the transaction information may identify multiple users, each having purchased a specific quantity of a batch of items that were offered for sell by a seller. In this case, a single transaction identifier may be associated with multiple user identifiers. A determination regarding whether a payment recorded in the payment table 38 indicates a payment made by a particular user for a purchase transaction recorded in the purchase transaction table 40 accordingly requires more than a comparison of merely a transaction identifier, and will also require a comparison of transaction identifiers.

Table 40 provides examples of transaction information items that may be received by the payment system 14 at operation 72.

Figure 5:
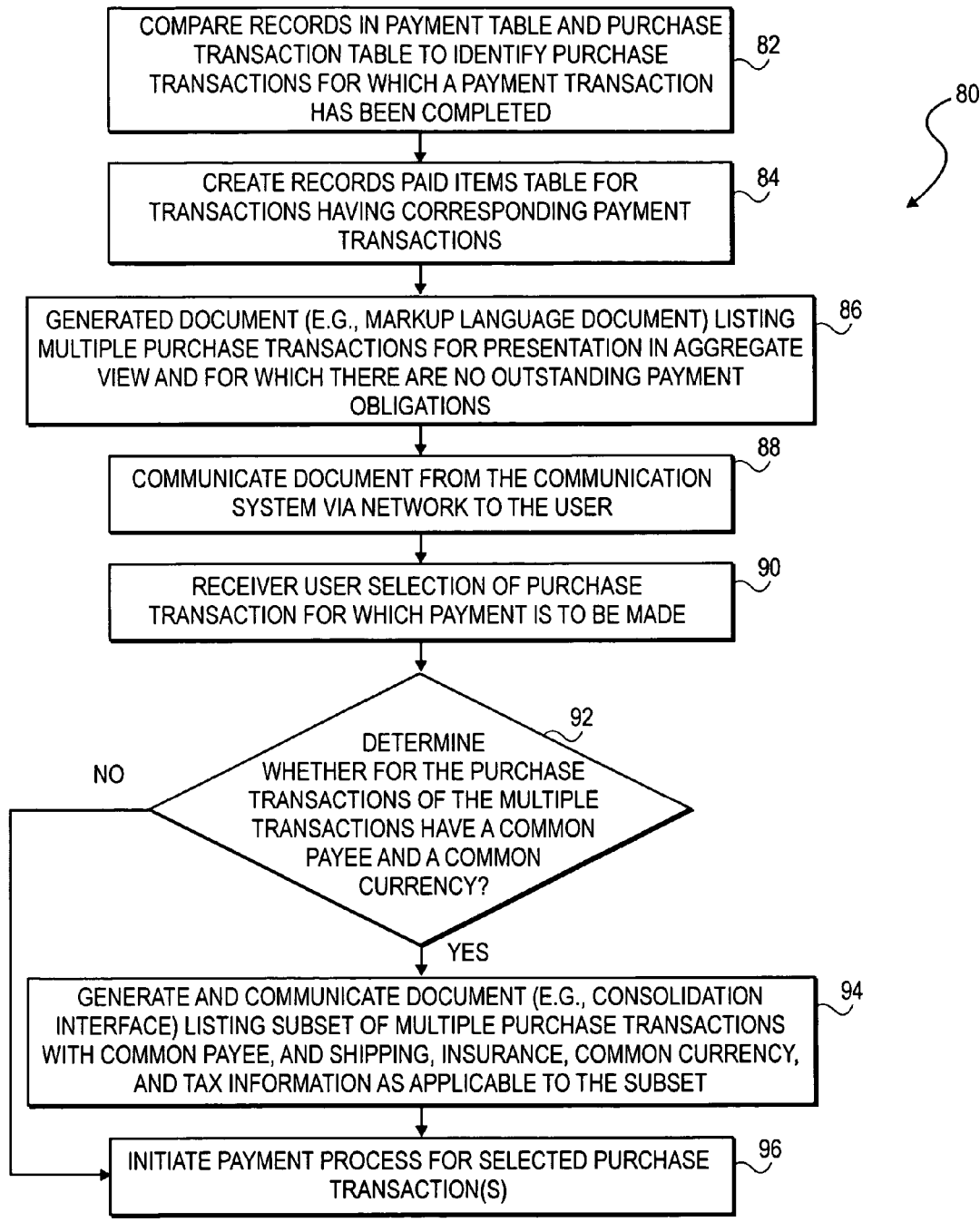
FIG. 5 is a flow chart illustrating a method, according to an exemplary embodiment of the present invention, to present a plurality of purchase transactions in an aggregation interface, in conjunction with a payment option to initiate an automatic payment process with respect to at least a subset of the multiple purchase transactions.

FIG. 5 is a flow chart illustrating a method 80, according to an exemplary embodiment of the present invention, to present a plurality of purchase transactions in an aggregation interface, in conjunction with a payment option to initiate an automatic payment process with respect to at least a subset of the multiple purchase transactions.

The method 80 commences at operation 82 with a comparison of records in the payment table 38 with records in the purchase transaction table 40. This comparison is performed with a view to identifying purchase transactions under which a user 20 has payment obligations, and for which no payment is recorded by payment system 14 as having been made in satisfaction of those obligations. This comparison may involve comparing any one or more of multiple fields within each of the payment table 38 and the purchase transaction table 40. Furthermore, the comparison operation may, in certain embodiments, require that calculations or transformations be performed in order to perform a meaningful comparison. It should also be noted that, in one embodiment, the comparison operation also seeks to identify only transactions for which a payment obligation is extant. Accordingly, at operation 82, a filter operation may also be performed to identify such transactions. For example, where the transaction system 12 supports an auction price-setting mechanism, the transaction information received at operation 72, described above with reference to FIG. 4, may identify an auction that has not closed and accordingly for which no payment obligation yet exists.

In short, the operation 82 seeks to identify transactions for which records exist within the transaction table 40 for which an unsatisfied and extant payment obligation exists. This may involve applying multiple filter criteria to filter out, for example, transactions for which a payment obligation has been discharged by the relevant user or transactions for which the payment obligation has not yet matured.

As described above, for certain transaction formats or mechanisms, for example, where items are being sold in a batch, multiple users may be associated with a single purchase transaction. In this case, the comparison operation 82 may involve detecting a correlation between both transaction identifiers, identifying specific transactions, as well as user identifiers within the tables 38 and 40.

At operation 84, the payment system 14 creates records in the paid items table 42 for purchase transactions identified at operation 82 and for which the payment obligations have been discharged. In one embodiment, the comparison operation 82, prior to performing a comparison between tables 38 and 40, may perform a comparison between entries of the purchase transaction table 40 and the paid items table 42 with a view to filtering transaction records for which a payment was previously identified.

Operations 82 and 84 may, in one exemplary embodiment of the presentation invention, be performed by the compare module 48 that comprises part of the communications system 26 of the payment system 14. However, in alternative embodiments, the operations 82 and 84 may be performed by comparison logic that resides elsewhere within the payment system 14, and that performs the relevant operation in response to events other than a specific request from a user.

Return now specifically to FIG. 5, at operation 86, the webscript module 46 creates a file or document, in the exemplary form of an HTML page, that includes transaction information for multiple purchase transaction identified at operation 82 as having outstanding payment obligations, with respect to one or more users 20. Specifically, the HTML document is an example of an aggregate interface within which information regarding the multiple purchase transactions is presented in aggregate view. Furthermore, the aggregate interface, together with transaction information pertaining to each of the multiple purchase transactions, presents a user-selectable payment option to initiate an automatic payment process with respect to at least the relevant purchase transaction.

Figure 6:
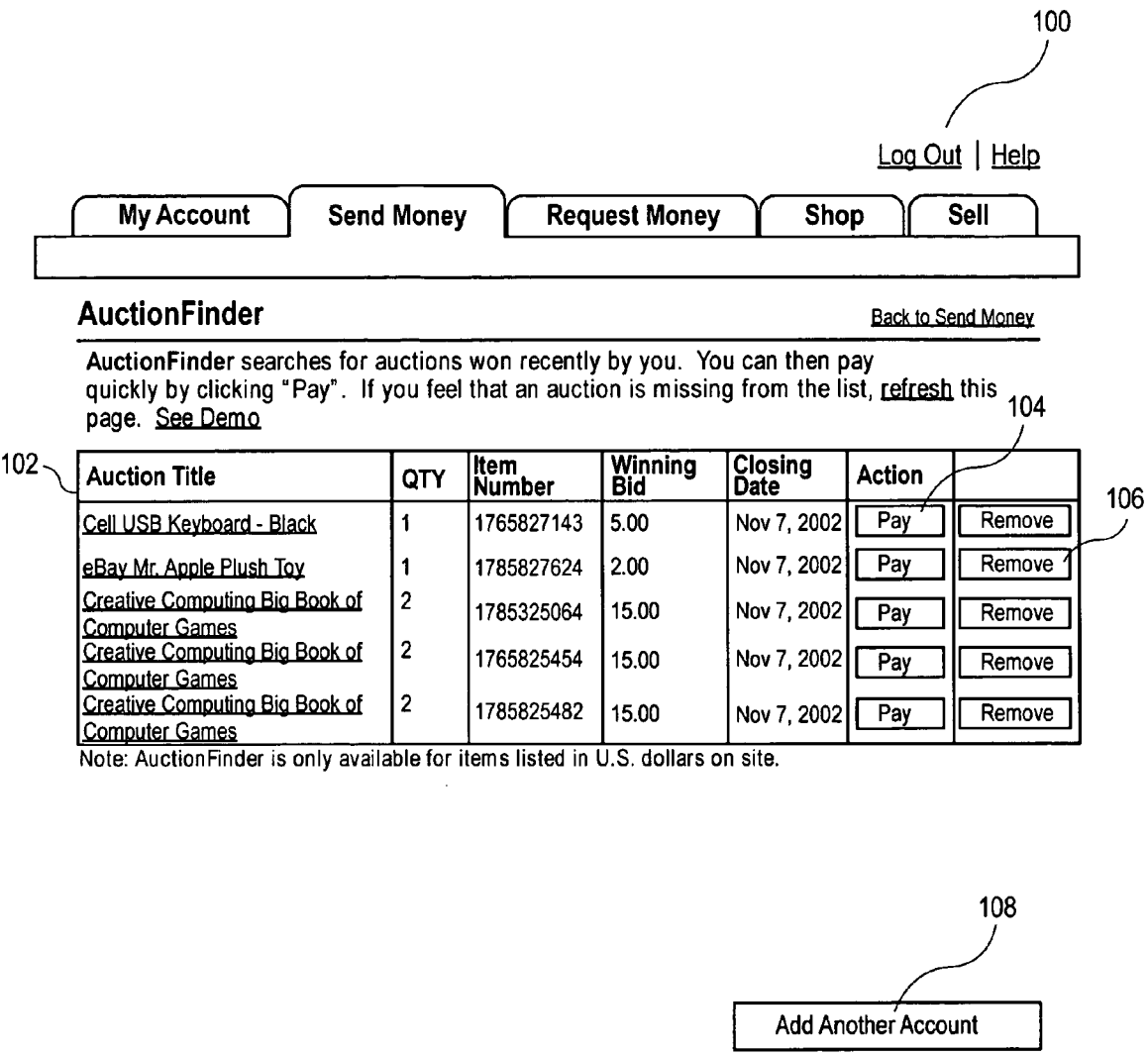
FIG. 6 is an interface diagram illustrating an aggregation interface, according to an exemplary embodiment of the present invention.

FIG. 6 is an interface diagram illustrating an aggregation interface 100, according to an exemplary embodiment of the present invention, which may be generated at operation 86. In the exemplary aggregation interface 100, a table 102 presents an aggregate view of information concerning multiple purchase transactions. Auctions that were won by a user on the eBay electronic marketplace would be examples of such transactions. As shown, title, quantity, item number, winning bid, and closing date information are displayed for each transaction. In addition, transaction information for each transaction is presented in the aggregation interface 100 in conjunction with a payment option, in the exemplary form of a pay button 104 and a removal option, in the exemplary form of a remove button 106. With respect to each of the transactions listed in the table 102, a user 20 can elect to make a payment of an amount (e.g., the winning bid) by selection of the pay button 104, or can elect to remove the transaction from a list of purchase transactions that the payment system 14 has identified as having outstanding payment obligations.

User selection of the pay button 104 will result in a communication to the payment system 14 to initiate an automatic payment process with respect to at least the pertinent transaction. Examples of such automatic processes may be any one of a number of payment flows, options, or processes offered by PayPal, Inc. One such automatic payment process is a "Send Money" process whereby funds are transferred from an account of a buy user 20 that is maintained by the payment system 14 to an account of the seller user 20 also maintained within the payment system 14. Each of these accounts maintained by the payment system 14 may optionally be linked to financial accounts of the relevant users maintained with other institutions or systems.

As noted above, the table 102 only contains listings for transactions that the payment system 14 has identified as having corresponding outstanding payment obligations. In an alternative embodiment, the payment system 14 may include transactions for which there is a possibility that a payment obligation may arise at some future time. For example, if an auction is in process on which the relevant user is bidding, transaction details for that auction could be presented within the table 102. In this case, the relevant transaction details could be presented in conjunction with an option for the user to elect automatic satisfaction of a payment obligation in the event that the payment obligation is incurred.

User selection of the remove button 106 will result in the relevant transaction being identified by the payment system 14 as no longer having an outstanding payment obligation. In the exemplary embodiment, responsive to user selection of the remove button 106, a message is communicated to the payment system 14 that causes the payment system 14 to initiate a process whereby a record for the pertinent transaction is created within the paid items table 42.

It will also be noted that the aggregation interface 100 includes an "add another account" button 108 by which the user can register a further user identifier and password for accessing the transaction system 12. If such information has been previously be supplied to the payment system 14, user selection of the button 108 will take the user to an interface that presents such further accounts for selection.

Returning to FIG. 5, at operation 88, the document generated at operation 86 is communicated via the communications system 26 of the payment system 14 to the user via the network 18. The aggregation interface 100 is then presented to the user, for example, as an HTML page displayed by a browser client executing on a machine of the user 20.

At operation 90, the payment system 14 receives user selection of a purchase transaction for which a payment is to be made, responsive to which the payment system 14 initiates an automatic payment process. Specifically, at operation 92, the payment system 14 (e.g., using the transaction identification system) determines whether any of the multiple transactions previously identified as having outstanding payment obligations require payment to a common user or entity (or payee). This determination is made by, for example, identifying records with outstanding payment obligations and reflecting a common seller user identifier for the transaction system 12. A further determination may optionally be made to determine whether the payment obligations were incurred in a common currency (e.g., the U.S. Dollar). If so, the transactions reflecting a common payee are grouped and a further document in the exemplary form of a consolidation interface is generated and communicated to the user 20 at operation 94.

Figure 7:
FIG. 7 is an interface diagram illustrating a consolidation interface, according to an exemplary embodiment of the present invention, in which transactions having a common payee are grouped for the purposes of presenting the payer with the option of making a single payment to the relevant payee for multiple transactions.

FIG. 7 is an interface diagram illustrating a consolidation interface 120, according to an exemplary embodiment of the present invention, in which transactions having a common payee are grouped for the purposes of presenting the payer with the option of making a single payment to the relevant payee for multiple transactions. Further, on the assumption that the payee may be shipping merchandise that is the subject of the transaction as a single shipment, shipping insurance and winning bid input fields 124, 126, and 128 are displayed. In one embodiment, these fields may be automatically populated with information extracted from the transactions listed in the table 122. Alternatively, the payee has the option of entering an alternative shipping value, reflecting a modified shipping value that results from the bulk shipment of multiple transactions. For example, the listed shipping costs for each of the transactions in the table 122 may be $3.00, assuming individual shipment. The cost of shipping the merchandise of all transactions within the table 122 together may however be less that the summed value of individual shipping costs.

Within the consolidation interface 120, the user 20 is again presented with the option, by user selection of a remove button 130, to remove an item. In one embodiment, user selection of the remove button 130 does not result in creation of a corresponding record within the paid items table 42, but merely operates to remove the relevant transaction from a consolidated-consolidated grouping.

While the exemplary consolidation interface 120 is described as grouping transactions in connection with a single common payee with which the payer has transacted, in a further exemplary embodiment, consolidated payments to each of multiple payees, with whom the payer has transacted, may be facilitated via the consolidation interface 120. For example, the consolidation interface 120 may present a grouped presentation of transactions with payee A, with the option to make a single payment to payee A, and a grouped presentation of transactions with payee B, with the option to make a single payment to payee B in satisfaction of obligations. The concurrent presentation of consolidated transactions for each of multiple payees may also be presented in conjunction with shipping insurance and other related charges pertaining to the consolidated transactions.

FIG. 7 also shows the consolidation interface 120 including a continue button 132, user selection of which results in display of a confirmation interface.

Figure 8:
FIG. 8 is an interface diagram illustrating a confirmation interface, according to one exemplary embodiment of the present invention, which presents details of a payment to be made by the user.

FIG. 8 is an interface diagram illustrating a confirmation interface 140, according to one exemplary embodiment of the present invention, which presents details of a payment to be made by the user 20. As will be noted, the confirmation interface 140 is pre-populated with information identifying the common payer (e.g., the email address of the payer), a payment amount, a shipping amount, a transaction total, and shipping information identifying an address to which the payer should ship the relevant merchandise. It will be noted that the payment amount reflects a sum total of the payment obligations, whereas a shipping amount is somewhat less than a sum total of the shipping amounts for the individual transaction for which a payment process has been aggregated. The confirmation interface 140 also illustrates a balance in an account of the user 20 from which the payment is being funded. The confirmation interface 140 is also shown to include a "send money" button 142 that is user-selectable to initiate the automatic payment process whereby funds are transferred from the payee to the payer. Returning to FIG. 5, at operation 96, an automatic process is initiated for the selected purchase transactions.

In short, the above described exemplary embodiments of the present invention are advantageous in that the payment system 14 is automatically enabled to identify transactions in which a particular user has participated via one or more transaction systems 12, and that may or may not be affiliated with the payment system 14, to identify which of those transactions may have outstanding payment obligations, and to present each of the relevant transactions to a user for selective discharge of payment obligations. The exemplary embodiments are furthermore advantageous in that the payment system 14 is enabled to identify transactions with a common payer, and to aggregate and consolidate the payment process with respect to that common payer for multiple transactions.

Figure 9:
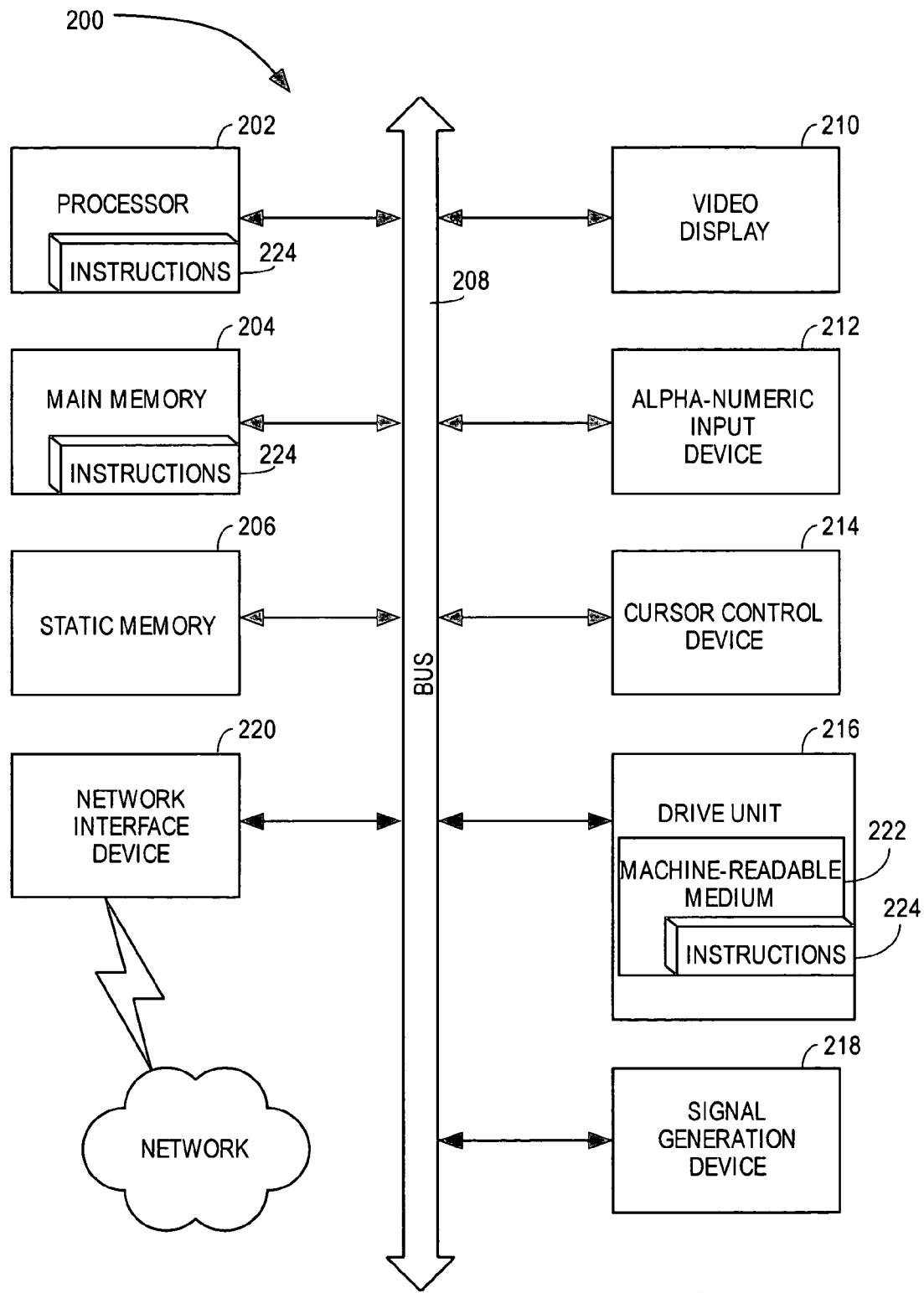
FIG. 9 shows a diagrammatic representation of a machine in the exemplary form of a computer system within which a set of instructions, for causing the machine to perform any one or more of the methodologies discussed herein, may be executed.

FIG. 9 shows a diagrammatic representation of a machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and system to facilitate payment with respect to multiple transactions have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A payment system including:

A processor;

Memory operatively coupled to the processor to execute instructions embodying a transaction identification system, an interface generator and a payment engine, wherein:

the transaction identification system configured to identify a plurality of purchase transactions, established utilizing a transaction system, that impose a plurality of corresponding payment obligations on a first user, the plurality of purchase transactions associated with at least two different payees, the transaction system to support at least one or more auction price setting mechanisms wherein the transaction identification system is to determine a combinable subset of the plurality of purchase transactions as being transactions having a common payee to group, from the plurality of purchase transactions, the combinable subset of the plurality of purchase transactions determined as having the common payee and to identify, from the combinable subset of the plurality of purchase transactions, an auction transaction in process as a transaction incurring no payment obligation yet;

the interface generator configured to generate an aggregation interface that presents the plurality of purchase transactions to the first user in conjunction with a payment option to initiate an automatic payment process with respect to at least the first subset of the plurality of purchase transactions; and the payment engine configured to initiate the automatic payment process to a second user, and with respect to the first subset of the plurality of purchase transactions, upon election by the first user of the payment option.

2. The payment system of claim 1, including a comparator to compare the plurality of purchase transactions with a plurality of payments made via the payment system, and to identify a second subset of the plurality of purchase transactions as corresponding to a subset of the plurality of payments, and to exclude a second subset of the plurality of purchase transactions from inclusion within the aggregation interface.

3. The payment system of claim 1, wherein the aggregation interface comprises a markup language document.

4. The payment system of claim 1, wherein the interface generator is to generate the aggregation interface to present a removal option to initiate a removal process with respect to at least one of the plurality of purchase transactions, the removal process to disqualify the at least one of the plurality of purchase transactions from the automatic payment process.

5. The payment system of claim 1, wherein the transaction identification system is to identify a combinable subset of the plurality of purchase transactions as being combinable, the interface generator is to generate a consolidation interface to present the combinable subset of the plurality of purchase transactions for payment via a single automatic payment process, and the payment engine is to initiate the single automatic payment process with respect to the combinable subset of the plurality of purchase transactions.

6. The payment system of claim 1, wherein the transaction identification system is configured to set as a shipping cost for the grouped purchase transactions an amount less than a summed value of individual shipping costs of the purchase transactions forming part of the group.

7. The payment system of claim 1, wherein the transaction identification system is configured to directly receive the plurality of purchase transactions associated with at least two different payees from the transaction system which established the plurality of purchase transactions.

8. The payment system of claim 1, wherein the plurality of purchase transactions associated with at least two different payees are established using a same transaction system.

9. A method to facilitate payment between parties to a purchase transaction, the method including:

identifying, at a payment system, a plurality of purchase transactions, established utilizing a transaction system different from the payment system, that impose a plurality of corresponding payment obligations on a first user, the plurality of purchase transactions associated with at least two different payees, the transaction system to support at least one or more auction price setting mechanisms wherein the identifying a plurality of purchase transactions includes determining, at the payment system, a combinable subset of the plurality of purchase transactions as being transactions having a common payee grouping, at the payment system, the combinable subset of the plurality of purchase transactions determined as having the common payee from the plurality of purchase transactions and identifying, from the combinable subset of the plurality of purchase transactions, an auction transaction in process as a transaction incurring no payment obligation yet;

generating an aggregation interface that presents the plurality of purchase transactions to the first user in conjunction with a payment option to initiate an automatic payment process with respect at least the first subset of the plurality of purchase transactions;

and initiating the automatic payment process to a second user, and with respect to the first subset of the plurality of purchase transactions, upon election by the first user of the payment option.

10. The method of claim 9, wherein the aggregation interface comprises a markup language document.

11. The method of claim 9, including generating the aggregation interface to present a removal option to initiate a removal process with respect to at least one of the plurality of purchase transactions, the removal process to disqualify the at least one of the plurality of purchase transactions from the automatic payment process.

12. The method of claim 9, including comparing the plurality of purchase transactions with a plurality of payments made via the payment system, identifying a second subset of the plurality of purchase transactions as corresponding to a subset of the plurality of payments, and excluding a second subset of the plurality of purchase transactions from inclusion within the aggregation interface.

13. The method of claim 9, including identifying a combinable subset of the plurality of purchase transactions as being combinable, generating a consolidation interface to present the combinable subset of the plurality of purchase transactions for payment via a single automatic payment process, and initiating the single automatic payment process with respect to the combinable subset of the plurality of purchase transactions responsive to input from the first user.

14. The method of claim 9, wherein the grouping the purchase transactions identified as having the common payee includes setting as a shipping cost for the grouped purchase transactions an amount less than a summed value of individual shipping costs of the purchase transactions forming part of the group.

15. The method of claim 9, wherein the payment system is configured to directly receive the plurality of purchase transactions associated with at least two different payees from the transaction system which established the plurality of purchase transactions.

16. The method of claim 9, wherein the plurality of purchase transactions associated with at least two different payees are established using a same transaction system.

17. A non-transitory machine-readable medium storing a sequence of instructions, that when executed by a machine, cause the machine to:
   identify, at a payment system, a plurality of purchase transactions, established utilizing a transaction system, that impose a plurality of corresponding payment obligations on a first user, the plurality of purchase transactions associated with at least two different payees, the transaction system to support at least one or more auction price setting mechanisms wherein the identification of a plurality of purchase transaction includes determining, at the payment system, a combinable subset of the plurality of purchase transactions as being transactions having of a common payee and grouping, at the payment system, the combinable subset of the plurality of purchase transactions determined as having the common payee from the plurality of purchase transactions and identifying, from the combinable subset of the plurality of purchase transactions, an auction transaction in process as a transaction incurring no payment obligation yet;
   generate an aggregation interface that presents the plurality of purchase transactions to the first user in conjunction with a payment option to initiate an automatic payment process with respect to at least the first subset of the plurality of purchase transactions;
   and initiate the automatic payment process to a second user, and with respect to the first subset of the plurality of purchase transactions, upon election by the first user of the payment option.

18. The machine-readable medium of claim 17, wherein the aggregation interface comprises a markup language document.

19. The machine-readable medium of claim 17, including: generate the aggregation interface to present a removal option to initiate a removal process with respect to at least one of the plurality of purchase transactions, the removal process to disqualify the at least one of the plurality of purchase transactions from the automatic payment process.

20. The machine-readable medium of claim 17, including: compare the plurality of purchase transactions with a plurality of payments made via the payment system, identify a second subset of the plurality of purchase transactions as corresponding to a subset of the plurality of payments, and exclude a second subset of the plurality of purchase transactions from inclusion within the aggregation interface.

21. The machine-readable medium of claim 17, including: identify a combinable subset of the plurality of purchase transactions as being combinable, generate a consolidation interface to present the combinable subset of the plurality of purchase transactions for payment via a single automatic payment process, and initiate the single automatic payment process with respect to the combinable subset of the plurality of purchase transactions responsive to input from the first user.

* * * * *

UNITED STATES PATENT AND TRADEMARK OFFICE
CERTIFICATE OF CORRECTION

| | | |
|---|---|---|
| PATENT NO. | : 7,805,366 B2 | |
| APPLICATION NO. | : 10/805414 | |
| DATED | : September 28, 2010 | |
| INVENTOR(S) | : Andrew D. Chen et al. | |

It is certified that error appears in the above-identified patent and that said Letters Patent is hereby corrected as shown below:

In column 11, line 4, delete "included," and insert -- include, --, therefor.

In column 11, line 18, in Claim 1, delete "A" and insert -- a --, therefor.

In column 11, line 19, in Claim 1, delete "Memory" and insert -- memory --, therefor.

In column 12, line 30, in Claim 9, delete "9. A method to facilitate payment between parties to a purchase transaction, the method including:
identifying, at a payment system, a plurality of purchase transactions, established utilizing a transaction system different from the payment system, that impose a plurality of corresponding payment obligations on a first user, the plurality of purchase transactions associated with at least two different payees, the transaction system to support at least one or more auction price setting mechanisms wherein the identifying a plurality of purchase transactions includes determining, at the payment system, a combinable subset of the plurality of purchase transactions as being transactions having a common payee grouping, at the payment system, the combinable subset of the plurality of purchase transactions determined as having the common payee from the plurality of purchase transactions and identifying, from the combinable subset of the plurality of purchase transactions, an auction transaction in process as a transaction incurring no payment obligation yet;
generating an aggregation interface that presents the plurality of purchase transactions to the first user in conjunction with a payment option to initiate an automatic payment process with respect at least the first subset of the plurality of purchase transactions;
and initiating the automatic payment process to a second user, and with respect to the first subset of
the plurality of purchase transactions, upon election by the first user of the payment option."
and
insert -- 9. A method to facilitate payment between parties to a purchase transaction, the method including:
identifying, at a payment system, a plurality of purchase transactions, established utilizing a transaction system different from the payment system, that impose a plurality of corresponding Signed and Sealed this
Twenty-seventh Day of March, 2012

David J. Kappos
*Director of the United States Patent and Trademark Office* payment obligations on a first user, the plurality of purchase transactions associated with at least two different payees,
> the transaction system to support at least one or more auction price setting mechanisms, wherein the identifying a plurality of purchase transactions includes determining, at the payment system, a combinable subset of the plurality of purchase transactions as being transactions having a common payee grouping, at the payment system, the combinable subset of the plurality of purchase transactions determined as having the common payee from the plurality of purchase transactions and identifying, from the combinable subset of the plurality of purchase transactions, an auction transaction in process as a transaction incurring no payment obligation yet;

generating an aggregation interface that presents the plurality of purchase transactions to the first user in conjunction with a payment option to initiate an automatic payment process with respect at least the first subset of the plurality of purchase transactions; and
> initiating the automatic payment process to a second user, and with respect to the first subset of the plurality of purchase transactions, upon election by the first user of the payment option. --, therefor.

In column 13, line 31, in Claim 17, after "mechanisms" insert -- , --.

In column 13, line 35, in Claim 17, after "payee" delete "and" and insert -- , --, therefor.

In column 13-14, lines 21-39 (Col. 13) & 1-12 (Col. 14), in Claim 18, delete "17. A non-transitory machine-readable medium storing a sequence of
instructions, that when executed by a machine, cause the machine to:
> identify, at a payment system, a plurality of purchase transactions, established utilizing a transaction system, that impose a plurality of corresponding payment obligations on a first user, the plurality of purchase transactions associated with at least two different payees, the transaction system to support at least one or more auction price setting mechanisms wherein the identification of a plurality of purchase transaction includes determining, at the payment system, a combinable subset of the plurality of purchase transactions as being transactions having of a common payee and grouping, at the payment system, the combinable subset of the plurality of purchase transactions determined as having the common payee from the plurality of purchase transactions and identifying, from the combinable subset of the plurality of purchase transactions, an auction transaction in process as a transaction incurring no payment obligation yet;
> generate an aggregation interface that presents the plurality of purchase transactions to the first user in conjunction with a payment option to initiate an automatic payment process with respect to at least the first subset of the plurality of purchase transactions;
and initiate the automatic payment process to a second user, and with respect to the first subset of the plurality of purchase transactions, upon election by the first user of the payment option."
and
insert -- 17. A non-transitory machine-readable medium storing a sequence of instructions, that when executed by a machine, cause the machine to:
> identify, at a payment system, a plurality of purchase transactions, established utilizing a transaction system, that impose a plurality of corresponding payment obligations on a first user, the plurality of purchase transactions associated with at least two different payees, the transaction system to support at least one or more auction price setting mechanisms wherein the identification of a plurality of purchase transaction includes determining, at the payment system, a combinable subset of the plurality of purchase transactions as being transactions having of a common payee and grouping, at the payment system, the combinable subset of the plurality of purchase transactions determined as having the common payee from the plurality of purchase transactions and identifying, from the combinable subset of the plurality of purchase transactions, an auction transaction in process as a transaction incurring no payment obligation yet;

generate an aggregation interface that presents the plurality of purchase transactions to the first user in conjunction with a payment option to initiate an automatic payment process with respect to at least the first subset of the plurality of purchase transactions; and initiate the automatic payment process to a second user, and with respect to the first subset of the plurality of purchase transactions, upon election by the first user of the payment option. --, therefor.